G. M. HEIM.
Reciprocating Churns.
No. 138,888. Patented May 13, 1873.
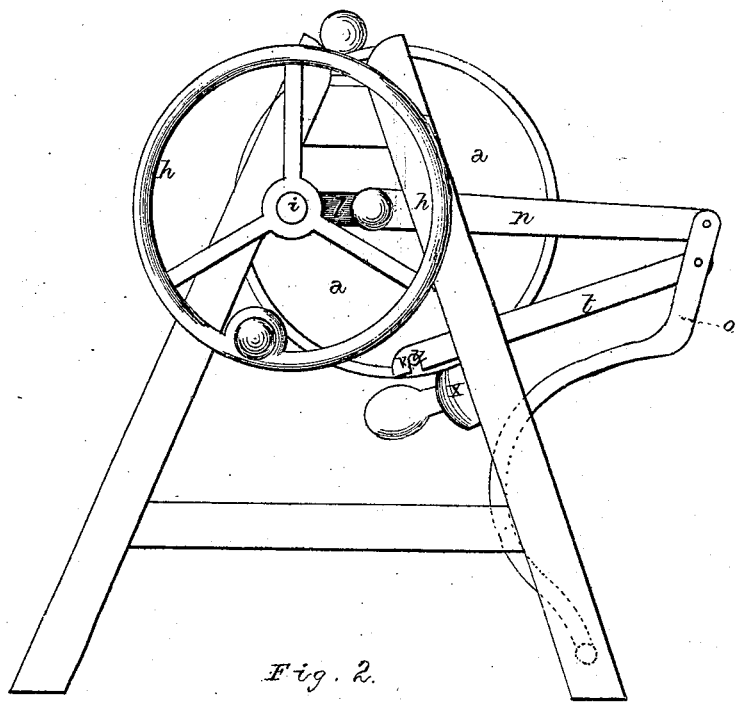
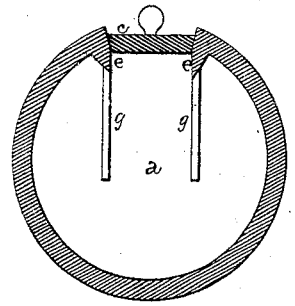
WITNESSES.
Wm. Johnson
Wm. F. Kendig.
INVENTOR.
Geo. M. Heim
per
F. A. Lehmann
Atty.

UNITED STATES PATENT OFFICE.

GEORGE M. HEIM, OF BROWNSVILLE, INDIANA.

IMPROVEMENT IN RECIPROCATING CHURNS.

Specification forming part of Letters Patent No. 138,888, dated May 13, 1873; application filed March 22, 1873.

*To all whom it may concern:*

Be it known that I, GEORGE M. HEIM, of Brownsville, in the county of Union and State of Indiana, have invented certain new and useful Improvements in Churns; and I do hereby declare the following to be a full, clear, and exact description of the invention, such as will enable others skilled in the art to which it pertains to make and use it, reference being had to the accompanying drawing which forms part of this specification.

The nature of my invention relates to an improvement in churns; and consists in the general arrangement and combination of parts, which will be more fully described hereafter and pointed out in the claim.

Figure 1 represents an end view of my invention. Fig. 2 is a cross-section of the churn-body.

$a$ represents the churn-body, made of a true cylinder, so as to be of the same width throughout, and which is hung upon journals placed eccentrically, so as to give it a rocking motion. Projecting downward into the body around the door $c$ are the flanges $e$ having a beveled side, so that, as the cream rebounds upon the reverse movement against the sides, these flanges will prevent it from striking against and knocking off the door. Extending downward from these flanges on each side of the door is is a row of arms, $g$, which serve to break the particles of the cream as they are thrown from side to side through them. Journaled in one end of the frame is the crank-shaft $i$, having the fly-wheel $h$ upon its outer end, and by which a reciprocating motion is imparted to the body $a$. Secured to the crank $l$ is a connecting-rod, $n$, having its other end secured to an upright rod pivoted to the side of the frame. Pivoted to this rod $o$ is the connecting-rod $t$, having a slot, $v$, cut in its under side, so as to enable it to be readily applied to and removed from the pin $u$ on the body $a$.

By pivoting the two connecting-rods to the upright rod $o$ the movement of the crank is imparted to the body in an even regular manner instead of by jerks and starts, as would otherwise be the case. By making the body of a true cylinder, after the butter is made, and the milk drawn off through the faucet $x$, by turning the crank and operating the churn-body, the butter will form itself into a roll, and can then be taken out without further trouble. When it is desired to wash or clean the body $a$ by taking the connecting-rod $t$ off the pivot or pin $u$ it can be readily lifted out of its journals and then replaced.

Having described my invention, what I claim as new, and desire to secure by Letters Patent, is—

1. In combination with the oscillating or vibrating churn-body $a$, the crank-shaft $i$, crank $l$, levers $n$ $t$, and pivoted rod $o$, when arranged to operate substantially as set forth.

In testimony that I claim the foregoing I have hereunto set my hand this 17th day of March, 1873.

GEORGE M. HEIM.

Witnesses:
 JOHN L. RITER,
 GEORGE W. SCHROYER.